United States Patent
Battlogg et al.

(10) Patent No.: US 12,210,695 B2
(45) Date of Patent: Jan. 28, 2025

(54) OPERATING SYSTEM WITH AT LEAST ONE OPERATING DEVICE AND WITH AT LEAST ONE INTERFACE DEVICE AND METHOD FOR OPERATING AN OPERATING SYSTEM

(71) Applicant: INVENTUS Engineering GmbH, St. Anton i.M. (AT)

(72) Inventors: Stefan Battlogg, St. Anton i.M. (AT); Mathias Brandl, Schruns (AT); Markus Mayer, Sulz (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 0 days.

(21) Appl. No.: 18/556,572

(22) PCT Filed: Apr. 20, 2022

(86) PCT No.: PCT/EP2022/060383
§ 371 (c)(1),
(2) Date: Oct. 20, 2023

(87) PCT Pub. No.: WO2022/223596
PCT Pub. Date: Oct. 27, 2022

(65) Prior Publication Data
US 2024/0370102 A1 Nov. 7, 2024

(30) Foreign Application Priority Data

Apr. 21, 2021 (DE) .................. 10 2021 110 172.7
Aug. 6, 2021 (DE) .................. 10 2021 120 544.1

(51) Int. Cl.
*G06F 3/0362* (2013.01)
*G05G 5/03* (2008.04)
(Continued)

(52) U.S. Cl.
CPC .......... *G06F 3/0362* (2013.01); *G05G 5/03* (2013.01); *G06F 3/016* (2013.01); *G06F 3/038* (2013.01);
(Continued)

(58) Field of Classification Search
CPC ................. G06F 3/016; G06F 3/038; G06F 2203/013–015; G06F 3/0487; G06F 3/048–0486
See application file for complete search history.

(56) References Cited

U.S. PATENT DOCUMENTS 10,976,827 B2   4/2021  Battlogg
11,231,780 B2 * 1/2022  Battlogg ............... B60K 35/00
(Continued)

FOREIGN PATENT DOCUMENTS

EP          3650995  A1    5/2020

OTHER PUBLICATIONS

Gamezopher, "Graph Editor Bezier Tool", Mar. 16, 2018 (Mar. 16, 2018), Retrieved from: URL:https://www.youtube.com/watch?v=WIKf3zeaE0U, XP055950002, [found Aug. 8, 2022], full video.
(Continued)

*Primary Examiner* — Patrick F Marinelli
(74) *Attorney, Agent, or Firm* — Laurence A. Greenberg; Werner H. Stemer; Ralph E. Locher (57) ABSTRACT

An operating system with an operating device and an interface device. The operating device has a receiving part and an operating element movably mounted on the receiving part relative to the receiving part for performing an input. A movement resistance for the movability of the operating element is set based on a relative position of the operating element by a controllable braking device and considers a stored assignment between relative positions and movement resistances. The assignment is adjustable via interface (Continued)

device. The interface device displays a coordinate system with default points for a setting range that can be positioned by an input means. The interface device creates a curve, which runs in accordance with the default points, and the interface device displays the curve on the user interface and determines the assignment based on the shape of the curve.

20 Claims, 7 Drawing Sheets

(51) Int. Cl.
*G06F 3/01* (2006.01)
*G06F 3/038* (2013.01)
*G06F 3/0482* (2013.01)
*G06F 3/0487* (2013.01)

(52) U.S. Cl.
CPC .......... *G06F 3/0482* (2013.01); *G06F 3/0487* (2013.01); *G06F 2203/015* (2013.01)

(56) References Cited

U.S. PATENT DOCUMENTS

| | | | |
|---|---|---|---|
| 11,775,091 B2* | 10/2023 | Battlogg | G06F 3/03543 |
| | | | 345/163 |
| 11,934,597 B2* | 3/2024 | Battlogg | G06F 3/03543 |
| 2002/0054021 A1 | 5/2002 | Rosenberg et al. | |
| 2002/0072814 A1 | 6/2002 | Schuler et al. | |
| 2018/0229704 A1* | 8/2018 | Eck | B60T 13/66 |
| 2020/0171949 A1* | 6/2020 | Battlogg | B60K 35/00 |
| 2022/0412416 A1* | 12/2022 | Battlogg | F16F 9/12 |
| 2022/0413627 A1* | 12/2022 | Battlogg | G06F 3/03543 |
| 2023/0087434 A1* | 3/2023 | Battlogg | G06F 3/0362 |
| | | | 345/163 |
| 2024/0143090 A1* | 5/2024 | Battlogg | G06F 3/04842 |

OTHER PUBLICATIONS

Ryu, Jonghyun; Choi, Seungmoon: posVibEditor: Graphical authoring tool of vibrotactile patterns. In: 2008 IEEE International Workshop on Haptic Audio visual Environments and Games. IEEE, 2008. S. 120-125.

* cited by examiner

Fig. 8b though the default points. In particular, interpolation points and fulcrum points are provided. This offers a particularly flexible option of adjustment.

OPERATING SYSTEM WITH AT LEAST ONE OPERATING DEVICE AND WITH AT LEAST ONE INTERFACE DEVICE AND METHOD FOR OPERATING AN OPERATING SYSTEM

FIELD AND BACKGROUND OF THE INVENTION

The present invention relates to an operating system with at least one operating device and with at least one interface device. The operating device comprises at least one receiving part and at least one operating element movably mounted on the receiving part. In order to carry out an input, the operating element can be moved relative to the receiving part using at least one finger. A movement resistance for the mobility of the operating element can be adjusted by means of at least one controllable braking device depending on a relative position of the operating element. The braking device takes into account at least one stored assignment of relative positions and movement resistances. The assignment can be adjusted by means of the interface device.

With such operating systems, the assignment is usually created in the course of manufacture or development and stored in the operating device. The assignment usually corresponds to a table, also referred to as a look-up table, in which values for the relative positions and for the movement resistances are listed. In this way it can be read which value the resistance to movement should reach at a specific relative position. The table is then stored in the operating device in a suitable format, for example as a file or firmware. For this purpose, a computer, for example, is connected to the operating device as an interface device.

In order to provide the operating device with extensive haptic signals or feedback, as described for example in WO 2018215 350 A1, a considerable number of values must be entered in such a table. In addition, the determination or calculation of the individual values is also very complex, for example if many different detent points or even vibrations (so-called ripple) are provided.

Furthermore, it is also very time-consuming and laborious for the user to make individual adjustments in the assignment. Comparable difficulties also arise for a manufacturer who wants to integrate the operating device into his product in order to control certain functions with it. Generally, the relevant values must first be identified in the extensive table. It must then be determined to which numerical values the table values must be increased or decreased in order to achieve the desired adjustment. For inexperienced users it is often very difficult to understand how the respective numbers actually affect and which haptic signal is finally perceived on the operating element.

SUMMARY OF THE INVENTION

In contrast, it is the object of the present invention to provide an operating system with improved possibilities for adaptation and, in particular, also for creating an assignment of relative positions and movement resistances. In particular, developers as well as inexperienced users or end users should be able to have a simple and understandable way of adapting the assignment.

This object is achieved by an operating system having the features of the claims and by a method having the features of the claims. Preferred developments of the invention are the subject matter of the dependent claims. Further advantages and features of the present invention result from the general description and the description of the exemplary embodiments.

The operating system according to the invention comprises at least one operating device and in particular at least one interface device. The operating device comprises at least one receiving part and at least one operating element that is movably or movably mounted on the receiving part. In particular, the operating element is pivotable and/or rotatable and/or mounted in a linearly displaceable manner on the receiving part. In order to carry out an input, the operating element can be moved relative to the receiving part by means of at least one finger and in particular rotated and/or pivoted and/or linearly displaced. In particular, the thumb is also understood as a finger. A movement resistance for the movability of the operating element can be adjusted by means of at least one controllable braking device as a function of a relative position of the operating element. The braking device takes into account at least one assignment of relative positions and resistances to movement that is stored (in a control device). In particular, the assignment of a relative position in each case assigns at least one movement resistance and/or in each case at least one relative position to a movement resistance. The assignment can be adjusted using the interface device. This is preferably also understood to mean that the assignment can also be produced (for the first time) in particular by means of the interface device. The interface device uses at least one graphical user interface to display at least one coordinate system. Default points for at least one setting area can be positioned in the coordinate system by means of an input device. In particular, the default points are visible on the user interface. The interface device is suitable and designed to create a function of the default points running curve and on the display user interface. In particular, the interface device is suitable and designed to determine the assignment as a function of a course of the curve and in particular to make it available to the braking device and for this purpose to preferably store it in a control device. In particular, this enables the assignment to be adapted by visually modulating curves.

The operating system according to the invention offers many advantages. The interface device offers a considerable advantage with the possibility of adapting the assignment by visually modulating curves. As a result, even inexperienced users can easily and easily understand how the course of the movement resistance looks, for example in the area of a detent point or another haptic signal. The default points also offer an advantage, with which the curves can be individually adjusted in a targeted and at the same time particularly clear and simple, for example with a mouse or on a touchscreen. Another benefit is that a curve is created and displayed based on the default points. This means that changes, for example by moving the default points, can be directly followed visually. Overall, the invention offers the possibility of a visual and intuitive adjustment of detent points and other haptic signals of the operating device. It can be seen at a glance, so to speak, how a specific adaptation of the assignment affects the haptic feedback on the operating element.

The default points preferably include interpolation points. In particular, the interface device is suitable and designed to create a curve running through the interpolation points. For example, the interpolation points can be connected with an interpolated curve or also with a linear curve. The default points preferably include fulcrum points. In particular, the interface device is suitable and designed to adjust curves depending on the position of the lever points (in the coordinate system or relative to the curve).

In particular, the fulcrum lies on a tangent of the curve. It is also possible that a tangent of the fulcrum intersects the curve or is tangent to the curve. The curve is preferably curved as a function of a lever length. The lever length is in particular a distance from the fulcrum to the curve, in particular along the tangent. In particular, the interface device can adjust the fulcrums on request or automatically in such a way that the curve has a symmetrical transition and/or a corner point and/or a smooth course (in particular at a curve section assigned to the fulcrum). In particular, default points can be added and/or removed with the input means.

In particular, the support points are displayed in a way that they can be graphically distinguished from the leverage points. This enables a particularly clear and intuitive editing of the assignments.

The interface device is preferably suitable and designed to determine values lying on the curve or at least approximately in the area of the curve (can also be referred to as points) and in particular to provide these values to the braking device for setting the movement resistance as a function of the relative position. In particular, the values are stored in an allocation table, which the braking device accesses. The values can be stored, for example, in the operating device itself and/or in a device that is operated with the operating device.

It is possible that the interface device is suitable for this and is designed to determine an allocation function from the curve and to provide the allocation function of the braking device for setting the movement resistance as a function of the relative position. It is also possible that the assignment function is made available to a device that is operated with the operating device. The device can then determine the curve or the values from the assignment function and provide them to the braking device so that it can set the movement resistance as a function of the relative position. Such a mapping function requires less memory than, for example, a tabular assignment with many individual values.

In particular, the interface device is suitable and designed to mathematically optimize the curve and to determine the assignment (preferably the assignment table and/or the assignment function) from an optimized curve. In particular, the interface device is suitable and designed to subject the curve to linearization at least in sections. In particular, such a linearization serves to be able to approximately describe the curve with a linear function. Other suitable optimization functions are also possible. As a result, only a small amount of memory is required overall, even with very high resolutions of the assignments.

It is possible and advantageous for at least one curve for an already predefined assignment to be stored in the interface device. In particular, this curve is displayed on the graphical user interface. In particular, this curve can be adjusted by positioning default points. Based on such a curve, a particularly simple and targeted adjustment of the assignment is possible.

Several curves for predefined assignments can be stored in the interface device. In particular, a curve can be selected and adjusted from these curves. For example, such curves can affect rest points that are particularly easy to overcome or particularly difficult to overcome. Such curves can also be equipped with particularly clearly perceptible haptic signals, for example with chaotically or randomly oscillating vibrations.

In a particularly advantageous development, the interface device is suitable and designed to create and/or adapt a curve and/or select a curve from several curves using a machine learning algorithm depending on user behavior and/or depending on the situation. A user can then optionally adjust such a curve even further. It is also possible for such a curve to be set automatically, for example if no further adjustment is planned or takes place. Machine learning algorithm can also be called artificial intelligence.

In particular, at least one curve with at least one peak-like maximum can be generated and preferably further adjusted in the setting area. In particular, the maximum is haptically perceptible when operating the operating element as a detent point (English tick). In particular, a detent point is characterized by an increase in the resistance to movement followed by a decrease in the resistance to movement. In particular, at least one peak and in particular a maximum is provided between the increase and the decrease in the resistance to movement. Further haptic signals can be assigned to the detent point, for example smaller peaks upstream and/or downstream. Such snap-in points are adjusted in particular by means of the curves that can be visually modulated. The interface device is preferably suitable and designed to use a user input to query how many setting areas (in particular, detent points) are desired. In particular, the interface device is suitable and designed to automatically determine a size of the setting range based on user specifications and to divide a movement range provided for the mobility of the operating element by the number of detent points. The size of the setting area can also be determined automatically using a machine learning algorithm as a function of user behavior and/or as a function of the situation.

For example, a movement range of 360° is provided for a rotary movement and twelve haptically perceptible detent points are desired, for example for selecting individual menu items of a device to be operated. Then 30° are provided for the adjustment range. For the rotary movement of 30°, a curve for e.g. a torque curve can be created and adjusted.

The interface device is preferably suitable and designed to automatically and/or on request accept an assignment adapted for one setting area for the other provided setting areas (in particular for the other detent points). In particular, the entire range of movement of the operating element can be equipped with an assignment. In particular, this function can be deactivated if required. In particular, the assignments created in this way can still be adjusted.

A size of the setting area is in particular adaptable in a user-defined manner. For example, the size of the adjustment range is a partial revolution or a full revolution or more than one revolution. In particular, the adjustment range is smaller than or equal to the movement range. For example, the size of the adjustment range is between 1° and 360° or a multiple of 360°. For example, the adjustment range may be 1.5 or two or 2.5 or five or more turns.

In all of the configurations, it is particularly preferred and advantageous for the assignment to be adaptable, taking into account a direction of movement of the operating element. For example, the detent points in one direction can be closer or more difficult to overcome than in the other direction. The direction of movement is in particular a direction of rotation. The direction of movement can also be a pivoting direction or a linear direction of movement. In particular, at least one (different) assignment is stored in the braking device for a backward movement and for a forward movement. It is also possible that only one assignment is stored for the braking device, which is automatically adapted by the braking device depending on the direction.

The interface device is preferably suitable and designed to provide a visually modulated curve for each direction of movement for a setting area. It is also possible for the interface device for the adjustment area to provide a visually modulated curve for one direction of movement and to automatically or selectively create or derive a curve for the other direction of movement. For example, a user input can be used to query whether or not a direction-dependent adjustment should take place for the setting area.

The interface device is preferably suitable and designed to automatically or upon request generate a curve for the other direction of movement from an adapted curve for one direction of movement and preferably to at least partially mirror the curve. In particular, the interface device is suitable and designed to at least partially adapt the curve and/or the assignment with at least one correction parameter to take into account finger kinematics of the human hand. The curve created in this way can be further adjusted if necessary. The interface device is preferably suitable and designed to adapt a (each) curve and/or a (each) assignment automatically or, if desired, at least in sections using the correction parameter.

Such a configuration is particularly advantageous in the case of a rotatable operating element, for example in the case of a mouse wheel or a finger roller or thumb roller. Such a correction parameter enables latching points and other haptic signals to be perceived identically in both directions of rotation. Such a correction parameter is also very advantageous for other operating elements that can be operated with just one finger.

It is preferred and advantageous that the correction parameter for a backwards movement (in particular backwards rotation), which takes place by stretching out the finger, provides for a lowering of the movement resistance at least in sections. It is also preferred and advantageous that the correction parameter for a forward movement (in particular a forward rotation), which takes place by retracting the finger, provides for an increase in the movement resistance. In particular, the reduction or increase in the resistance to movement occurs relative to the resistance to movement in the respective other direction.

The interface device is particularly suitable and designed to adapt a curve at least partially with at least one speed correction parameter to take into account a movement speed of the operating element. In particular, the speed correction parameter provides that the movement resistance provided in an assignment is raised and/or lowered as a function of the movement speed of the operating element. In particular, the connection is taken into account that with increasing speed of movement of the operating element, the resistance to movement should increase so that the resistance to movement that can be felt on the operating element remains at least approximately the same.

The speed correction parameter is preferably configured as a function of the resistance to movement versus the speed or acceleration of the operating element. In particular, the speed correction parameter can also be created and/or adjusted using a curve. In particular, as described here for the adjustment of the assignment.

The interface device is particularly suitable and designed to create an assignment for the first time as a function of default points. As a result, the association can be generated, in particular during production and/or a reconfiguration, by curves that can be visually modulated. This also enables manufacturers and developers to easily adjust the assignment.

The applicant reserves the right to claim an operating device which is intended in particular for the operating system according to the invention. The operating device comprises at least one receiving part and at least one operating element movably mounted on the receiving part. In particular, the operating element is mounted on the receiving part in a pivotable and/or rotatable and/or linearly displaceable manner. The operating element can be moved relative to the receiving part and in particular rotated and/or pivoted and/or linearly displaced in order to carry out an input using at least one finger. A movement resistance for the mobility of the operating element can be adjusted by means of at least one controllable braking device depending on a relative position of the operating element. As a result, the mobility of the operating element can be subjected to an adjustable grid. The grid includes detent points, each of which includes a movement resistance curve with an ascending phase and a descending phase and in particular at least one high point lying between the ascending phase and the descending phase.

In particular, a latching point during the movement of the operating element is haptically perceptible as a result. The braking device is suitable and designed to automatically set a movement resistance that increases during the movement or at least temporarily remains the same during the movement when there is a change in the direction of movement of the operating element.

Such an operating device offers many advantages and enables a particularly precise haptic of the grid. In this way, it is reliably and inexpensively prevented that, when the direction is reversed, there is initially a decreasing resistance to movement, which feels imprecise and spongy.

The increasing or constant resistance to movement relates in particular to the resistance to movement as a function of the relative position. In particular, the operating device comprises at least one sensor device for detecting the direction of movement of the operating element.

Preferably, when a movement direction of the operating element changes, the rasterization automatically begins at an increasing phase of the movement resistance curve. In particular, the braking device is suitable and designed to (always) start the rasterization with a rising phase after a change in the direction of movement, regardless of the relative position of the operating element. In particular, when the direction of movement changes, a valley phase of the movement resistance curve is skipped, which lies between a descent phase and an increase phase.

In particular, the movement resistance curve is provided for each direction of movement. Depending on the direction of movement, the movement resistance curve can be designed to be the same or also different. For example, depending on the direction of movement, a correction factor can be applied to take finger kinematics into account.

The applicant reserves the right to claim an operating device which is provided in particular for the operating system according to the invention. This operating device comprises at least one receiving part and at least one operating element movably mounted on the receiving part. In particular, the operating element is pivotable and/or rotatable and/or mounted in a linearly displaceable manner on the receiving part. In order to carry out an input, the operating element can be moved relative to the receiving part by means of at least one finger and in particular rotated and/or pivoted and/or linearly displaced. A movement resistance for the movability of the operating element can be adjusted by means of at least one controllable braking device as a function of a relative position of the operating element. The braking device takes into account at least one stored assignment of relative positions and movement resistances.

In this case, the braking device is suitable and designed to automatically adapt the stored assignment as a function of a direction of movement of the operating element or, if desired, with a correction parameter to take finger kinematics of the human hand into account. The correction parameter provides for a backwards movement (in particular backwards rotation), which takes place by stretching out the finger, at least in sections reducing the resistance to movement. The correction parameter provides for an increase in the movement resistance for a forward movement (in particular a forward rotation), which takes place by retracting the finger.

Such an operating device also offers many advantages and enables a particularly precise feel when operating, for example, a computer mouse or a finger roller on a steering wheel of a motor vehicle.

In the context of the present invention, the term revolution or information about revolutions, torques and speeds relate in particular to a rotary movement of a rotatable operating element and in particular also to a rotary movement of the braking device. In particular, the rotational movement of the braking device relates to a braking component which is rotatable relative to another braking component of the braking device. In particular, such information relates to the braking device if the operating element can be pivoted and/or linearly displaced and therefore cannot itself perform a rotary movement.

Such operating elements are then coupled to the braking device, in particular by means of a transmission device. In particular, the transmission device converts a pivoting movement and/or linear movement of the operating element into a rotary movement for one of the braking components of the braking device. However, such information can also relate to the braking device in the case of a rotary operating element.

In all embodiments, the movement resistance for the mobility of the operating element is preferably a torque for the rotatability of the operating element and/or a moment for linear mobility of the operating element. In particular, within the scope of the present invention, the term "motion resistance" can be replaced by "torque" or "moment" or the term "rotatable" or "rotatability" can be replaced by "movable" or "moveability" (where appropriate).

In particular, the operating device comprises at least one sensor device for directly and/or indirectly detecting the relative position of the operating element. The relative position of the operating element is detected in particular by sensory detection of an angular position of the rotatable brake component relative to the other brake component. Alternatively or additionally, the relative position of the operating element can also be detected by sensors via a position of the operating element itself and/or a transmission device coupled to the operating element.

The braking device is preferably designed to be magnetorheological. In particular, the braking device comprises at least two braking components that can be rotated relative to one another. In particular, the braking device comprises at least one magnetorheological medium and at least one field generation device for generating a magnetic field and in particular also for controlling a magnetic and/or electric field strength. In particular, the medium can be influenced by means of the field generating device in order to adjust the mobility of the braking components relative to one another and thus also the movement resistance (in particular the moment or torque) for the mobility of the operating element. Particularly detailed haptic feedback can be generated with a magnetorheological braking device.

In particular, a graphic plotting of movement resistances as a function of the relative position and, for example, an angle is plotted and displayed in the coordinate system. In particular, a plot of a variable for the movement resistance in relation to a variable or as a function of a variable for the relative position is displayed in the coordinate system. The relative position is in particular an angle. The relative position is preferably a rotation angle or a swivel angle or a linear position value. The relative position can also correspond to another characteristic variable for a relative position of the operating element. The resistance to movement is represented in particular by a variable for a force and, for example, a torque or the like. The resistance to movement can also correspond to another variable that is characteristic of the resistance to movement. For example, a current or a voltage of a coil of a magnetorheological braking device can be provided as a variable for the movement resistance.

In particular, the interface device is suitable and designed to create and/or adapt the assignment using visually or graphically modulated curves. The interface device includes in particular at least one algorithm for executing the steps. In particular, the invention relates to parametric modeling of assignments using default points on the graphical user interface. In particular, the interface device is suitable and designed to carry out the procedurally formulated features or steps. The interface device can include a graphical user interface and/or an input means.

In the context of the present invention, a curve is also understood to mean, in particular, linear connections of the default points. In particular, the interface device is suitable and designed to at least approximately calculate and preferably interpolate the curve depending on the specification points and preferably between the support points and in particular also taking the leverage points into account. In particular, the interface device can be used to adapt the assignments according to the type of Bezier curves. In particular, the default points are designed to create Bezier curves. In particular, the default points can only be positioned in a permissible area, so that critical or non-adjustable assignments can be avoided.

In particular, at least one range of motion is provided for the mobility of the operating element. In particular, the operating element can be moved within the range of movement and preferably only within the range of movement. The range of motion can be infinite. The operating element can then be rotated in particular (infinitely). The range of movement can also be designed to be limited or limitable. In this case, the operating element can in particular be designed to be rotatable, pivotable and/or linearly displaceable. Range of motion may be mechanically limited and, for example, have mechanical stops. It is also possible and preferred for the range of movement to be designed so that it can be limited by means of the braking device. In particular, a haptic limitation of the range of movement is then provided. For example, the limitation takes place through a targeted increase in the movement resistance, so that no (further) movement is possible with the intended finger forces.

Moving the operating element in one direction or in both or all directions of movement is more possible. In particular, the range of movement can be limited at any position by means of the braking device. Such a limitation can also be referred to as a haptic or simulated stop. It is also possible for the range of movement to be limited both mechanically and individually by means of the braking device.

In particular, there are several relative positions in the movement area. In other words, the operating element can be moved to different and preferably arbitrary relative positions within the range of movement. The resistance to movement on the operating element can be felt at a relative position, which is assigned to which of the relative positions according to the assignment is. At a relative position, the operating element is subjected to the movement resistance assigned in each case. The movement resistance can be adjusted by means of the braking device from freely rotatable to braked to blocked for the intended finger forces.

In particular, the adjustment range presents at least part of the range of movement. The adjustment range can include the entire range of motion. In particular, a large number of adjustment areas are provided for the movement area. By means of the visually modulated curves, the assignment can be set individually for each setting area.

Further advantages and features of the present invention result from the description of the exemplary embodiments, which are explained below with reference to the attached figures.

DETAILED DESCRIPTION OF THE INVENTION

FIGS. 1a to 1f show several operating devices 901 operating systems 900 in which the magnetorheological braking device 1 can be used.

Figure 1A:
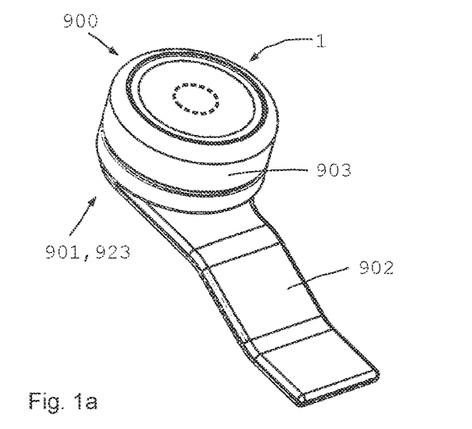
FIG. 1a-1f shows purely schematic representations of control systems according to the invention with control devices.

FIG. 1a shows a haptic control knob 923 or rotary knob 923. The control knob has a receiving part 902. The operating knob 923 is operated via the operating element 903. A user interface can be used to transmit information to an interface device 800 and to transmit an assignment 804 or an assignment function 804b for a desired movement resistance curve 804b.

Figure 1B:
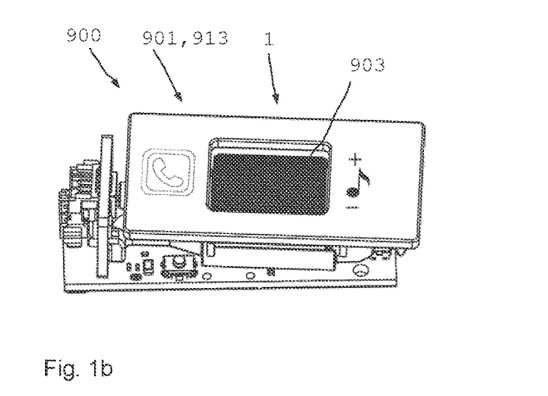

In FIG. 1b, the operating device 901 of the operating system 900 is shown as a finger roller 913 with a magnetorheological braking device 1. The finger roller 913 can preferably be used in steering wheels, for example. However, the finger roller 913 is not limited to this application. The finger roller 713 can generally also be used with any other finger, depending on the installation situation.

Figure 1C:
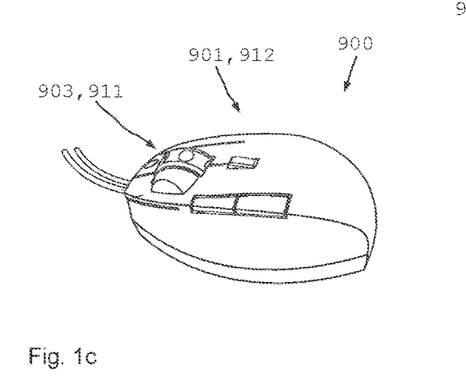
Figure 1D:
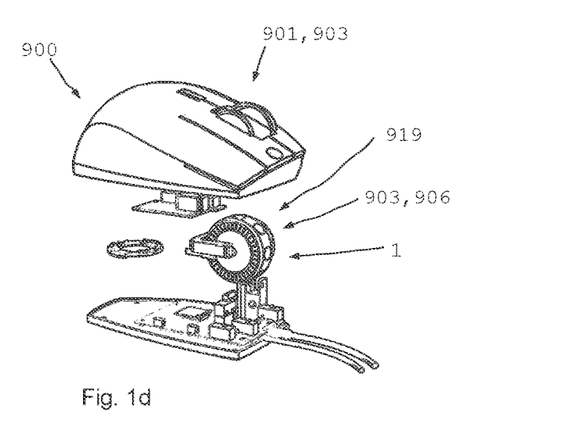

In FIG. 1c and FIG. 1d, the operating system 900 is designed as a computer mouse 912. The operating device 901 is housed in the mouse wheel 911. The magnetorheological braking device 1 can be used to control haptic feedback. A gear unit 919 is used to translate the movement of the mouse wheel 911.

Figure 1E:
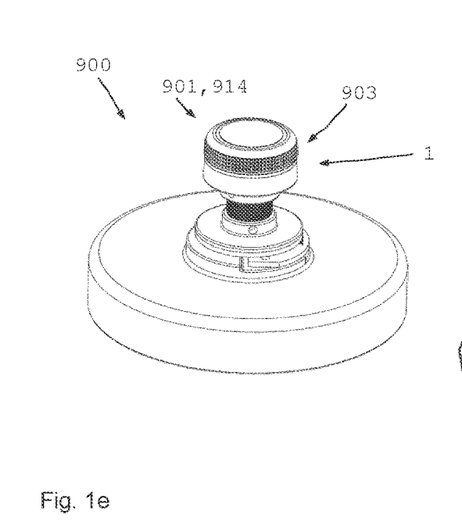
Figure 1F:
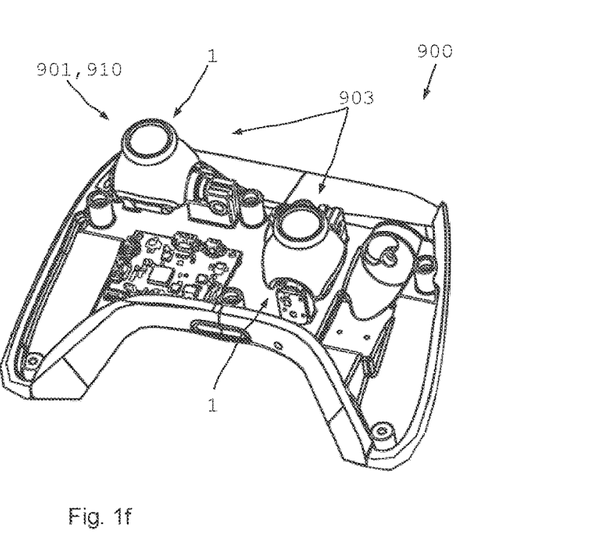

FIG. 1e shows a joystick 914 as a haptic operating device 901, in which a magnetorheological braking device 1 is accommodated. In addition, the magnetorheological braking device 1 can also preferably be used in a gamepad 910 in order to give the player haptic feedback depending on the game situation, see FIG. 1f.

In these exemplary embodiments, the magnetorheological braking device 1 has a receiving part 903 designed as the first braking component 2 and an operating element 903 designed as the second braking component 3, which can be moved relative to one another. A resistance to movement 802 between the two braking components 2,3 can be changed, so that a user receives haptic feedback.

An operating system 900 with a haptic operating device 901 can be used, for example, to operate machines, medical devices or for use in and for the motor vehicle. It is also possible to use it on other devices or devices.

Figure 2:
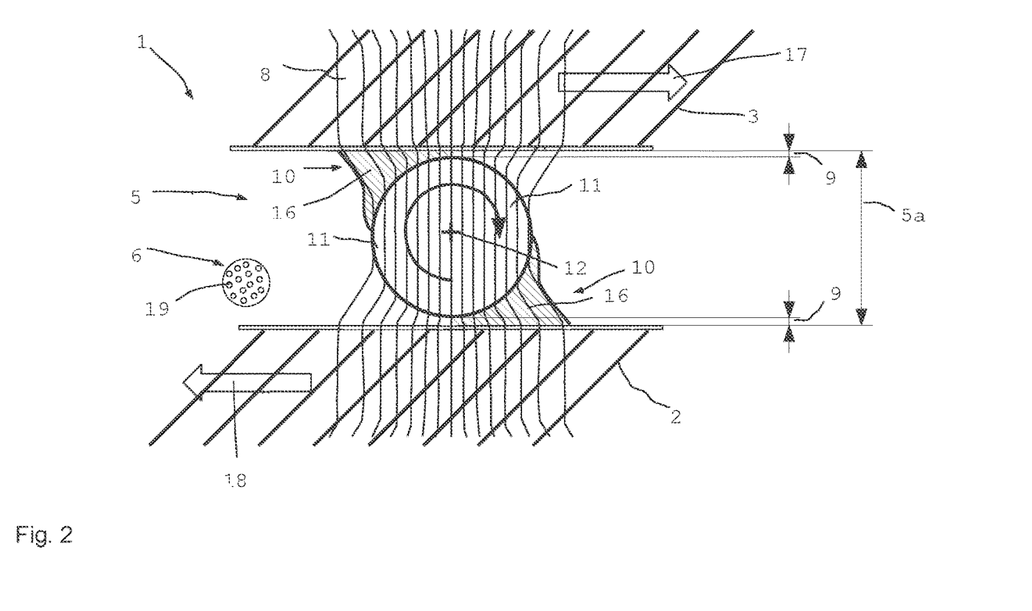
FIG. 2 shows a purely schematic cross-sectional illustration of a magnetorheological braking device.

FIG. 2 shows a highly schematic cross-sectional view of a magnetorheological braking device 1 for influencing the power transmission between two brake components 2 and 3.

A gap 5 with a gap width 5a is provided between the brake components 2 and 3 and is filled with a medium 6 here. The medium 6 comprises ferromagnetic particles 19 such as carbonyl iron powder which may be suspended in a fluid such as water or oil or air.

Between the two brake components 2 and 3 in FIG. 2 there is a transmission component 11, e.g., a rolling body 11 or rotating body 11 is provided. The rolling body 11 has no direct contact with the surface of the brake components 2 and/or 3 and therefore does not roll directly onto it. A free distance 9 can be a multiple of the diameter of a typical average particle diameter.

Despite the distance between the transmission component 11 and the brake components 2, 3, the transmission component 11 can be caused to rotate by friction as a result of the relative speed. The rotary movement is possible without and also with an acting magnetic field 8.

If the magnetorheological braking device 1 is subjected to a magnetic field 8, the field lines 8 (shown purely schematically here) form depending on the distance between the rolling elements 11 and the braking components 2, 3. Transmission component 11 and brake components 2, 3 preferably consist at least partially of ferromagnetic material, which is why the smaller the distance between rotary body 11 and brake components 2, 3, the higher the magnetic flux density. The field lines 8 (magnetic circuit) pass through the transmission component 11 in concentrated form. The inhomogeneous and strong field there leads to a local and strong crosslinking of the magnetically polarizable particles 19 (magnetic chaining).

By rotating the transmission component 11 in the direction of the acute-angled area 10, the effect of the wedge 16 forming in the medium 6 is greatly increased and the possible braking or clutch torque is extremely increased, far beyond the amount that would normally occur in a shear flow the medium 6 can be generated between parallel surfaces. A mechanical amplification of the magnetorheological effect can go so far that power transmission is possible even after switching off an applied magnetic field if the particles have been wedged.

Figure 3:
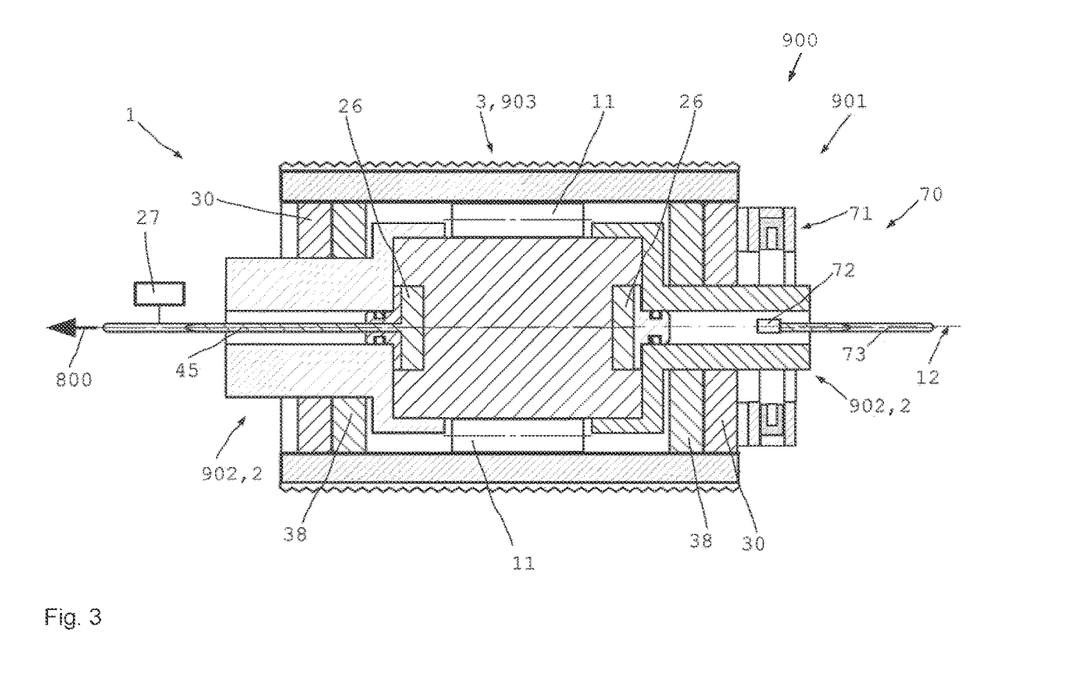
FIG. 3 shows a schematic cross section through an operating device of an operating system with a magnetorheological braking device.

FIG. 3 shows a schematic cross section through an operating device 901 of an operating system 900 with a magnetorheological braking device 1, which has two braking components 2 and 3. Here, the first brake component 2 forms the multi-element receiving part 902 and the second brake component 3 forms the rotatable operating element 903. The second brake component 3 is continuously rotatably and axially displaceably received relative to the first brake component 2 through the bearings 30 thereon.

A closed chamber, which is filled with the medium 6, is formed between the brake components 2 and 3. Gaskets 38 reliably seal the interior. A plurality of transmission components 11 are arranged in the gap 5 between the brake components 2, 3 here. The multi-part first braking component 2 comprises an electric coil 26 for generating the magnetic field 8 and the movement resistance 802.

The electrical coil 26 is connected to the control device 27 for control purposes via a cable 45, which can also be used for connection to an interface device 800. There is also a sensor device 70 with a magnetic field sensor 72 with a sensor line 73 and a magnetic ring device 71 to detect an angular position 803 or a relative position 803 of the two brake components 2, 3 to one another and to transmit this to the control device.

Figure 4:
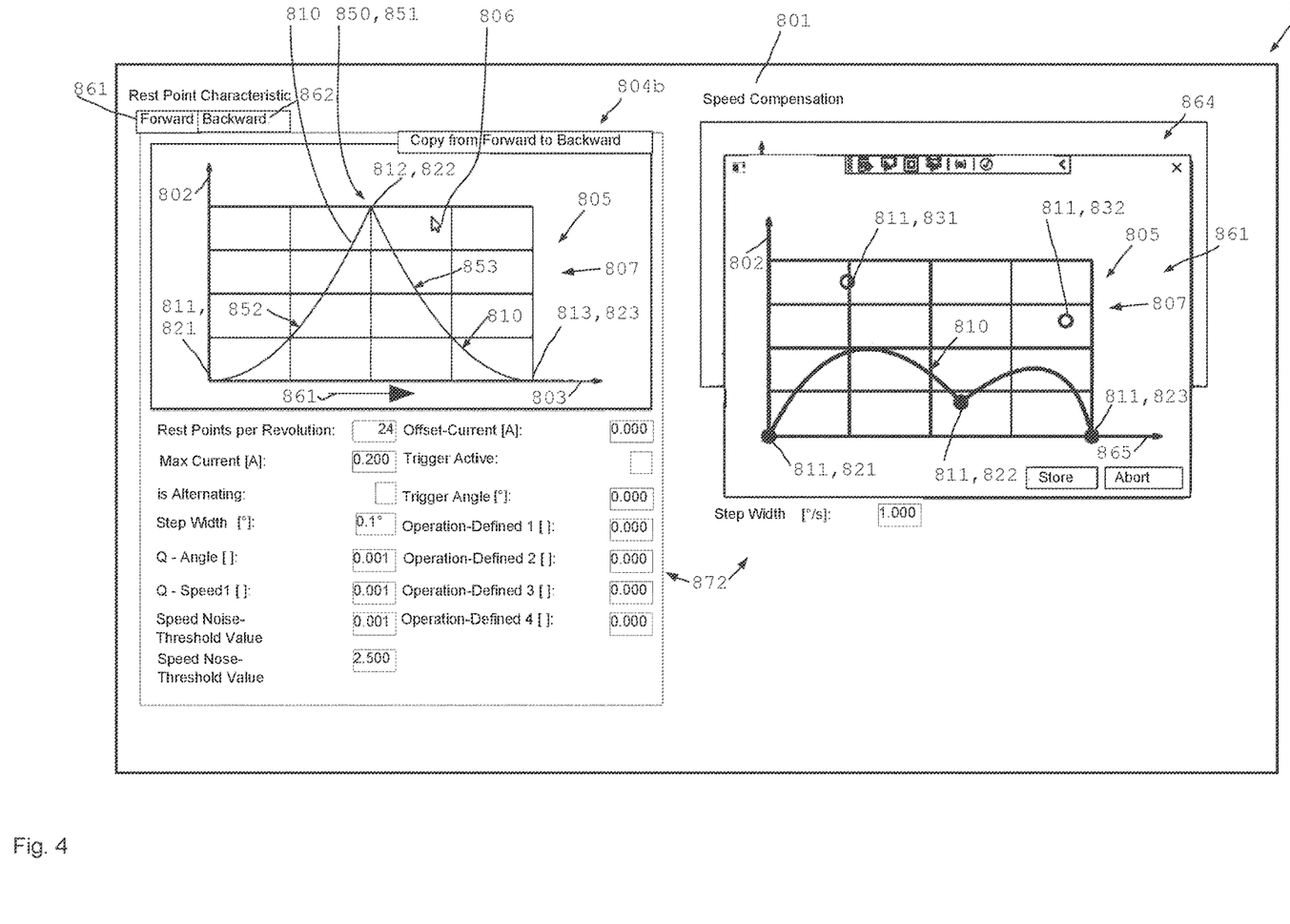
FIG. 4 shows an exemplary embodiment of a user interface according to the invention of an interface device of an operating system.

FIG. 4 shows an exemplary embodiment of a user interface 801 of an interface device 800. A movement resistance curve 804b is shown on the left. The speed correction parameter 864 is shown on the right.

The course of resistance to movement 804b includes a coordinate system 805 in which the resistance to movement 802 is plotted against the relative position 803 of the receiving part 902 and operating element 903. In the coordinate system 805 there are three default points 811, 812, 813 which define a curve 810. The default points 811, 812, 813 are here as Support points 821, 822, 823 are executed, i.e., the curve runs through the default points 811, 812, 813.

The default points 811, 812, 813 can be moved and adjusted by a user using input means 806 designed here as a mouse pointer in a setting area 807 defined by the coordinate system 805. In addition, a user can add further default points or remove them (again) in order to adapt the curve 810 and thus the movement resistance curve 804b to his personal requirements.

In addition to the visual manipulation, there are further setting parameters 872 through which the curve 810 can be adjusted. In particular, a desired curve 810 can be generated and/or an existing curve 810 can be changed by the additional setting parameters 807.

The movement resistance curve 804b can be set depending on the direction of movement, i.e., forward 861 or backward 862. The figure shows the movement resistance profile 804b for the forward movement direction 861. A movement resistance curve 804b set for one direction of movement 861, 862 can also be transferred to the other direction of movement 861, 862, so that a movement resistance curve 804b is present regardless of the direction of movement 861, 862.

Here, the movement resistance curve 804b is designed as a detent point 851, which has a high point 850, which is designed as a peak-like maximum 850. With increasing relative position 803, i.e., for example, at an angular position 803, the user first feels a rising phase 852, in which the movement resistance 802 increases noticeably for the user to the peak 850. If the user overcomes the movement resistance at the high point 850, the movement resistance 802 decreases noticeably again in the descent phase 853. The curve 810 represents the movement resistance curve 804b. The user of the haptic operating device perceives this movement resistance curve 804b here as a rest point 851.

This movement resistance curve 804b can be used, for example, as a stop when scrolling through a long list with a mouse wheel 911 of a computer mouse 912. The user can adjust the curve 810 here by shifting the default points 811, 812, 813. For example, he can adapt the maximum movement resistance 802 to his own needs, such as finger strength perceived as pleasant, by moving the default point 812 in the coordinate system 805 up or down. It is also possible, for example, to change the slope of the rise phase 852 and the fall phase 853 by horizontally shifting the default point 812 in the coordinate system 805. Shifting the set point 812 further to the left would project the rise phase 852 to a smaller area of relative position, such that the user perceives the high point 850 as a "sudden" impact, while the fall phase 853 is perceived as a large area.

The speed correction parameter 864 is shown on the right in the user interface 801 of the interface device 800. The movement resistance 802 is changed by the speed correction parameter 864 depending on the speed at which the operating element 903 is moved by the user. Here is the speed correction parameter 864 for the forward movement direction 861 in the coordinate system 805. The curve 810 is described here by a total of five default points 811, which can be visually moved in the setting area 807 by the user using an input means 806. The curve 810 includes three interpolation points 821, 822, 831 and two fulcrums 831, 832. The fulcrum points 831, 832 allow a course of the curve 810 to be adjusted independently of the interpolation points 821, 822, 823. Also for the speed correction parameters, further setting parameters 872 are available.

In the curve 810 shown, the movement resistance 802 initially increases with increasing movement speed 865 and then decreases in a wave-like manner with further increasing movement speed 865. For example, the user can set the motion resistance 802 to quickly set an optimal scrolling speed for reading, but without limiting it for other operations.

Figure 5:
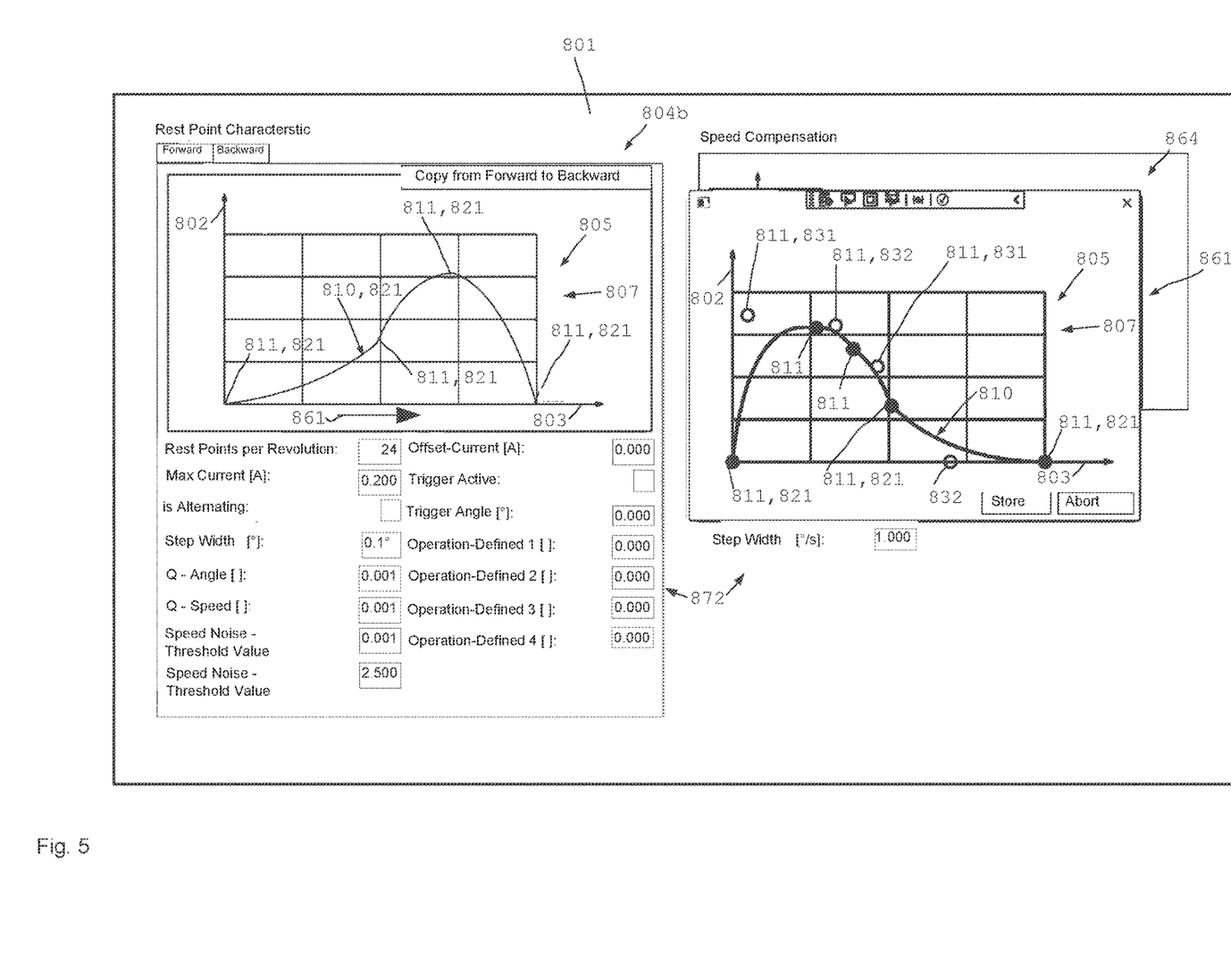
FIG. 5 shows a further exemplary embodiment of a user surface of an interface device.

FIG. 5 shows a further exemplary embodiment of a user interface 801 of an interface device 800. A movement resistance curve 804b is shown on the left. The speed correction parameter 864 is shown on the right. Here the movement resistance profile 804b and the four default points 811, which are all designed as support points 821. The speed correction parameter 864 includes eight default points 811, which are designed as supporting points 821 and lever points 831,832.

Figure 6:
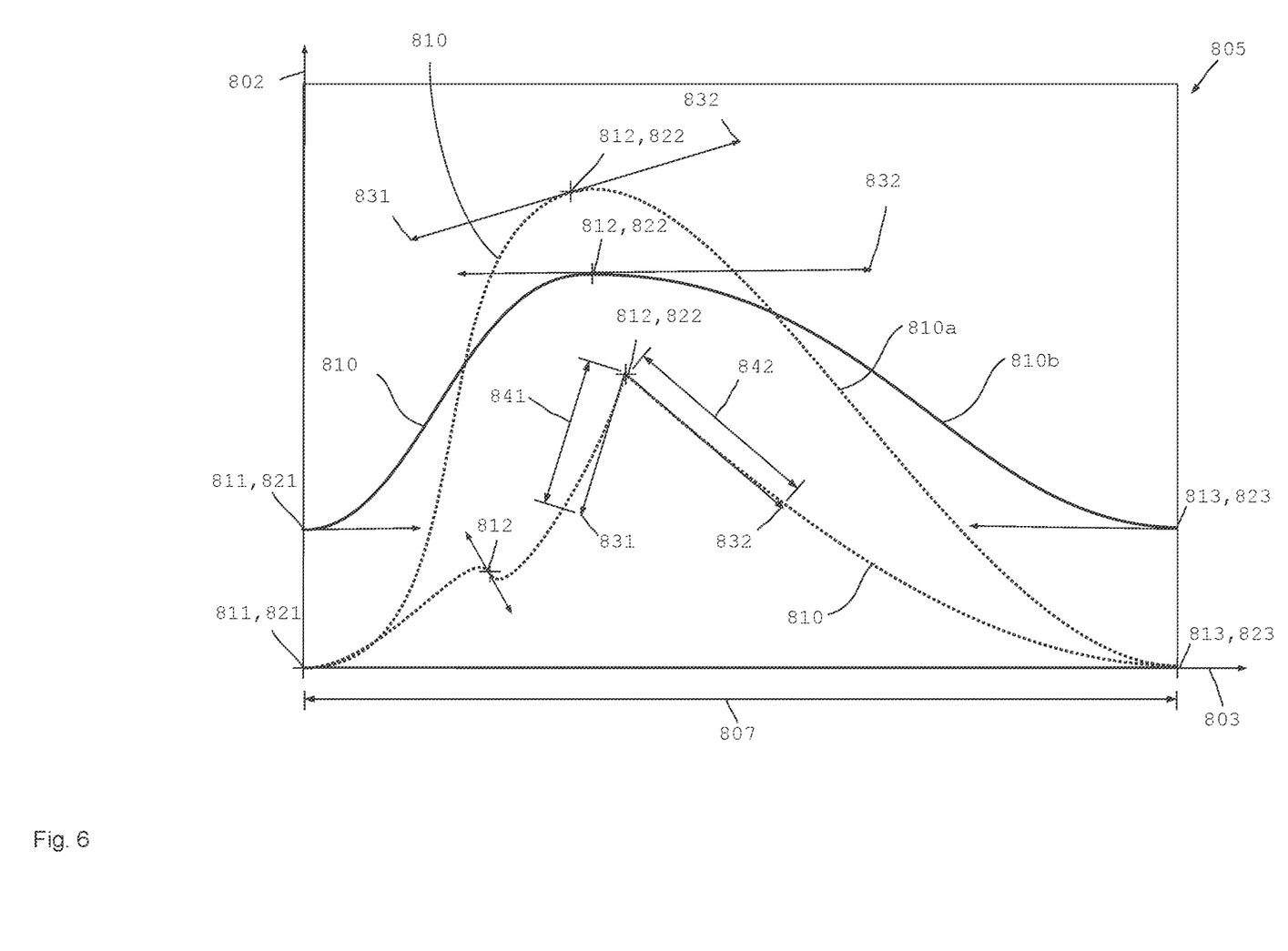
FIG. 6 shows different movement resistance curves in a coordinate system of a user interface of an interface device of the operating system.

FIG. 6 shows various curves 810, 810a, 810b of the movement resistance course 804b in a coordinate system 805 of a user interface 801 of an interface device 800 of an operating system 900. Each of the curves 810, 810a, 810b includes a plurality of default points 811, 812, 813, which are represented here by support points 821, 822, 823 and fulcrums 831, 832 are provided.

The fulcrums 831, 832 lie on the tangent of the curve 810, 810a, 810b. The slope of the curve 810 at a support point 821, 822, 823 can be changed by shifting a lever point 831, in the setting range. The weighting of the gradient is regulated by the respective lever length 841, 842. A long lever arm 841, 842 thus also leads to a high influence of the position of the fulcrum 831, 832 on the course of the curve 810. The course of the curves 810, 810a, 810b can thus be adapted very flexibly to the needs and/or specifications of the user.

Figure 7:
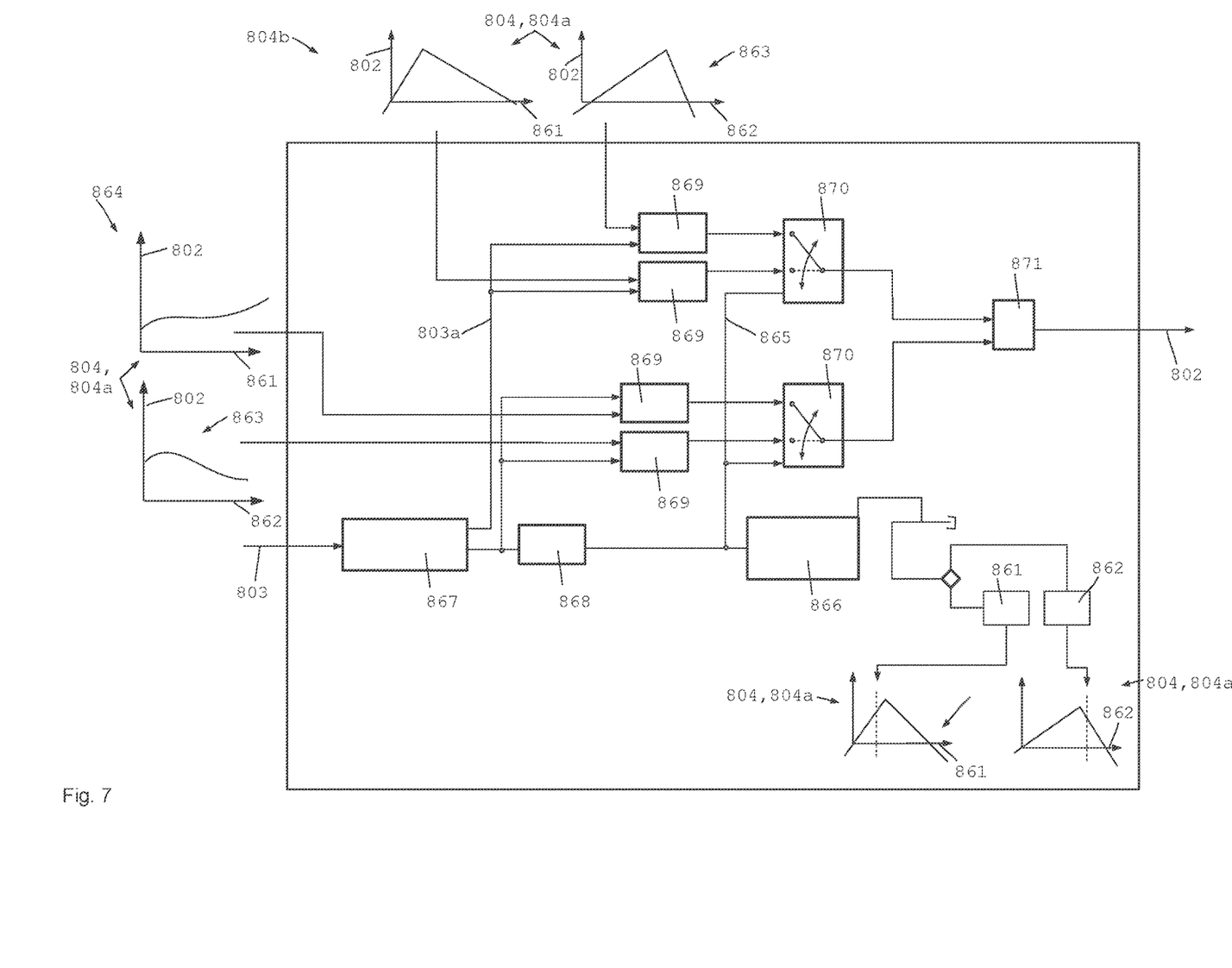
FIG. 7 shows an overview diagram of the functioning of the operating system and a method according to the invention.

FIG. 7 shows an overview diagram of the functioning of the operating system 900 and the method according to the invention. The curves 810 of the movement resistance profiles 804b and of the speed correction parameter 864 generated with the user interface 801 of the interface device 800 can be stored in the operating device 901 as assignments 804 or assignment functions 804b. For this purpose, the operating device can include, for example, a corresponding control device 27 with a storage unit on which the assignments 804 and/or assignment functions 804a can be stored. The assignments 804 or assignment functions 804a can be different for the forward 861 or backward 862 movement directions.

If a user changes the relative position 803 of the operating element 903 to the receiving part 902, this is detected by a sensor device 73. The captured sensor data is filtered by a filter 867. For precise detection of the direction of movement, this is determined with a delay using a hysteresis 868, i.e., small or short changes in the direction of movement 861, 862 are not taken into account.

Based on the filtered relative position 803a and the movement speed 865, movement resistances 802 are interpolated 869 from the stored assignments 804 or assignment functions 804a depending on the direction-dependent movement resistance curves 804b and the direction-dependent speed correction parameters 864. Depending on the direction of movement 862, 863, the movement resistance curves are interpolated 802 and the speed correction parameter 864 combined 871 by selection switch 870 to form a movement resistance 802.

It is also possible to couple a movement resistance 802 between two directions of movement 861, 862 using a correction parameter 863. This makes it particularly easy to select the resistance to movement in the backwards direction of movement, in particular to be lower as a function of the movement resistance curve 804b in the forwards direction of movement 861. The correction factor 863 makes it possible for a user, for example, to feel the movement resistance 802 to be of the same weight when retracting or extending a finger. This is also possible for the speed correction parameter 863.

In this way, the anatomy, for example of the user's hand or fingers, can advantageously also be taken into account.

A change in the direction of movement 866 is also recorded here. In this way, the starting position on the movement resistance curve 804b can be adjusted as a function of the change in the direction of movement 866. For example, the starting position on the resistance to movement curve 804b can be adjusted so that the user always experiences an initially increasing or decreasing resistance to movement 802 as haptic feedback when the direction of movement is changed from forward 861 to backward 862 or vice versa.

The resistance to movement 802 then serves as a control variable for the activation of the electrical coil and the generation of the magnetic field 8, through which the resistance to movement 802 is passed on to the user.

Figure 8A:
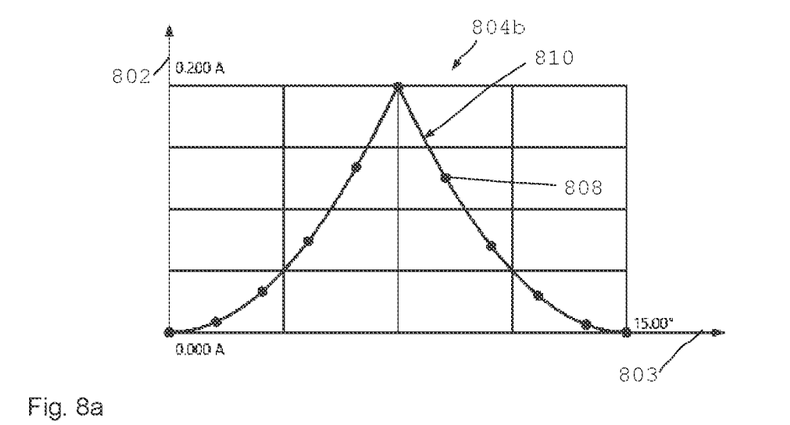
FIG. 8a-8b shows sketches to illustrate how the interface device works.
Figure 8B:
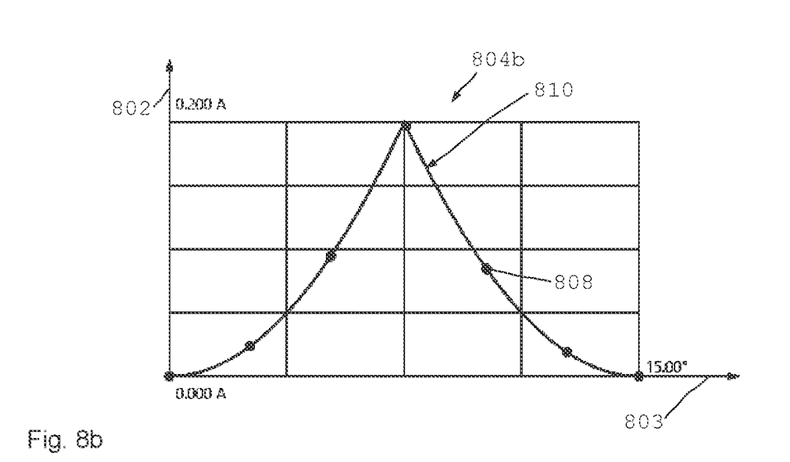

FIGS. 8a and 8b show mathematically optimized (simplified) curves 810, which are based on curve 810 described with reference to FIG. 4. The allocation table or the allocation function 804a is then determined from the optimized curves 810, as described above. This can save memory space.

It has been shown that, depending on the resolution of the assignments 804 (so-called step width, e.g., 0.1° relative position or angle of rotation with the respectively assigned movement resistance value), a large number of values sometimes have to be stored in the memory of the operating device 901. For example, with 24 ticks per revolution (=>15° per tick) and a step width of 0.1°, a total of 150 values for the assignment 804 are saved. On the one hand, this storage effort can be reduced by specifying an assignment function, or it can be massively reduced by mathematically optimizing the desired curve 810.

For the optimization, the curve 810 in FIG. 4 was subjected to a linearization. FIGS. 8a and 8b each show different strongly linearized profiles of the curve 810 in FIG. 4. In practice, the maximum permissible error in the linearization (e.g., 1%) of the curve 810 can be specified and the software then determines the number of (e.g., between the start and end points and the apex) interpolation points 808. These interpolation points 808 and the manually specified start, end and vertex points are e.g., stored in the assignment table. The higher the permissible error, the fewer supporting points 808 are required. Movement resistance values of rotational angle positions that lie between two interpolation points 808 can be read by the interface device 800, e.g., can also be determined by a linear interpolation.

The optimization in FIG. 8a provides a maximum error of 1.1% here and thus achieves a linearization with a total of 11 support points 808. The optimization in FIG. 8b provides a maximum error of 3% and thus achieves an even greater simplification of the curve 810, so that only 7 interpolation points 808 are required here.

LIST OF REFERENCES 1 braking device
2, 3 braking component
5 gap, channel
5a gap width
6 medium
8 magnetic field
9 free distance
10 acute-angled area
11 transmission component
12 axis of rotation
16 wedge
17 direction of forward relative movement
18 direction of backward relative movement
19 magnetic particles
26 coil
27 controller
30 bearing
38 gasket
45 cable
70 sensor
71 magnetic ring unit, device
72 magnetic field sensor
73 sensor
800 interface device
801 user interface
802 resistance to movement
803 relative position, angular position
804 assignment
804a assignment function
804b movement resistance
805 coordinate system
806 input
807 setting area
808 reference point
810 curve
810a curve
810b curve
811-813 default point
821-823 reference point
831-832 fulcrum
841-842 lever length
850 peak 851 detent point
852 rise phase
853 descent phase
861 forward direction of movement
862 backward direction of movement
863 correction parameters
864 speed correction parameter
865 movement speed
866 change of direction of movement
867 filters
868 hysteresis function
869 interpolation
870 selector switch
871 combined parameter
872 further setting parameters
900 operating system
901 operating device
902 receiving part
903 operating element
910 gamepad
911 mouse wheel
912 computer mouse
913 finger roller
914 joystick
919 gear unit
923 control knob, rotary knob

The invention claimed is:

1. An operating system comprising:
at least one operating device and at least one interface device;
said operating device having at least one receiving part and at least one operating element movably mounted on the receiving part;
said operating element being configured to move relative to the receiving part for performing an input;
at least one controllable braking device being configured to adjust a movement resistance for the movability of the operating element based on a relative position of the operating element;
said braking device being configured to operate based on at least one stored assignment of relative positions and movement resistances, and the assignment being adjustable via the interface device;
said interface device having at least one graphical user interface configured to display a coordinate system with default points for at least one setting area that can be positioned with an input device; and
said interface device being configured to create at least one curve that runs as a function of the default points, display said at least one curve on the user interface, and determine the assignment as a function of a course of the curve, so that adjustment of the assignment is made possible by visually modulating said at least one curve.

2. The operating system according to claim 1, wherein the default points include interpolation points and the interface device is configured to create a further curve of the at least one curve running through the interpolation points.

3. The operating system according to claim 1, wherein default points include lever points and the interface device is configured to adjust the curve depending on the position of the fulcrums.

4. The operating system according to claim 3, wherein the fulcrum lies on a tangent of the curve and/or the curve is adjusted as a function of a lever length.

5. The operating system according to claim 3, wherein the interpolation points are represented graphically distinguishable from the lever points.

6. The operating system according to claim 1, wherein the interface device is configured to determine values lying on the curve and to transmit these values to the braking device for setting the movement resistance in dependence of the relative position.

7. The operating system according to claim 1, wherein the interface device is configured to determine an assignment function from the at least one curve and the assignment function of the braking device for setting the movement resistance depending on the relative position.

8. The operating system according to claim 1, wherein in the interface device has a curve of the at least one curve stored for a predefined assignment and said curve is displayed and customizable by positioning default points.

9. The operating system according to claim 1, wherein several curves of the at least one curve for predefined assignments are stored in the interface device and one curve can be selected from these curves and is customizable.

10. The operating system according to claim 1, wherein the interface device is configured to create and/or adjust a curve of the at least one curve using a machine learning algorithm based on user behavior and/or a use situation and/or select from multiple curves.

11. The operating system according to claim 1, wherein a curve of the at least one curve with at least one peak-like maximum can be generated in the setting area and the peak-like maximum acts as a latching point when the control element is operated and is haptically perceptible.

12. The operating system according to claim 1, wherein the interface device is configured to query how many setting areas are desired by a user, to automatically determine a size of the setting area based on the user specification, and to divide a range of motion of the movability of the control element by a number of detent points.

13. The operating system according to claim 1, wherein the interface device is configured to automatically and/or on request adjust an assignment of one setting area for other provided setting areas.

14. The operating system according to claim 1, wherein the size of the setting area can be customized.

15. The operating system according to claim 1, wherein the assignment can be adjusted based at least partially on a direction of movement of the operating element.

16. The operating system according to claim 1, wherein the interface device is configured to provide a visually modulatable curve for each direction of movement for a setting area.

17. The operating system according to claim 15, wherein the interface device is configured to automatically create a curve of the at least one curve for one direction of movement based on an adjusted curve for one other direction of movement, and to at least partially mirror the curve and adapt it with at least one correction parameter based at least partially on the finger kinematics of the human hand.

18. The operating system according to claim 17, wherein the correction parameter is configured to at least sectionally lower a movement resistance for a backward movement, which takes place by extending the finger of a user, and/or increase a movement resistance for a forward movement, which takes place by retracting the finger of a user.

19. The operating system according to claim 1, wherein the interface device is configured to adjust the at least one curve at least partially with at least one speed correction parameter based on a movement speed of the operating element.

20. The operating system according to claim 1, wherein the interface device is configured to create an assignment as a function of default points, and said assignment is adjustable during production and/or a reconfiguration by visually modulatable curves.

\* \* \* \* \*